United States Patent
Dheur et al.

(10) Patent No.: US 7,350,550 B2
(45) Date of Patent: Apr. 1, 2008

(54) TIRE WITH ELECTRICALLY NON-CONDUCTIVE TREAD WHICH CONTAINS A SELF LOCKING ELECTRICALLY CONDUCTIVE RUBBER STRIP EXTENDING THROUGH SAID TREAD TO ITS RUNNING SURFACE

(75) Inventors: Jean Luc Dheur, Arlon (BE); Gia Van Nguyen, Rossignol (BE); Michel Jacques Meunier, Gouvy (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 93 days.

(21) Appl. No.: 10/971,363

(22) Filed: Oct. 22, 2004

(65) Prior Publication Data

US 2005/0103411 A1 May 19, 2005

Related U.S. Application Data

(60) Provisional application No. 60/523,053, filed on Nov. 18, 2003.

(51) Int. Cl.
*B60C 1/00* (2006.01)
*B60C 11/00* (2006.01)

(52) U.S. Cl. .............................. 152/152.1; 152/209.5; 152/DIG. 2

(58) Field of Classification Search ............. 152/152.1, 152/209.5, DIG. 2, DIG. 3, 151.1
See application file for complete search history.

(56) References Cited

U.S. PATENT DOCUMENTS 5,350,001 A * 9/1994 Beckmann et al. .... 152/DIG. 3

(Continued)

FOREIGN PATENT DOCUMENTS

EP 681931 11/1995

(Continued)

OTHER PUBLICATIONS

European Search Report, no date.

*Primary Examiner*—Steven D. Maki
(74) *Attorney, Agent, or Firm*—Henry C. Young, Jr.

(57) ABSTRACT

This invention relates to a tire having an electrically non-conductive tread which contains an electrically conductive rubber strip which extends through at least a portion of the tread to its running surface in a wave configured shape, and therefore not a continuous straight line within said tread, in which at least a portion of the rubber strip is in a shape of, for example, a substantially sinusoidal, cycloidal and/or zigzag form, to thereby provide a mechanical self-locking configuration between tread segments through which the rubber strip extends and divides. In particular, said tread is composed of a cap/base configuration. The outer cap layer is of a relatively electrically non-conductive rubber composition having a running surface intended to be ground-contacting. The tread base layer, underlying the tread cap layer, is of a relatively electrically conductive rubber composition and is not normally intended to be ground-contacting. A thin rubber strip, unitary with and as an extension of said tread base layer, which is thereby relatively electrically conductive, extends radially outward from said tread base layer of which at least a portion of the rubber strip is in a form of a wave-shaped configuration through, and therefore within, said tread cap layer to an outer running surface of said tread cap layer. In practice therefore, said rubber strip extends from, and as a part of, said tread base layer through said tread cap layer. In practice, said thin layer extending in said tread cap exhibits substantially at least one half an undulation, and preferably substantially at least two undulations of its wave configured shape of, for example, a substantially sinusoidal, cycloid al and/or zigzag form. The form of the individual undulations of the wave shaped configuration of the strip within the tread may be the same or different.

6 Claims, 2 Drawing Sheets

U.S. PATENT DOCUMENTS

| | | | |
|---|---|---|---|
| 5,783,002 A * | 7/1998 | Lagnier | 152/DIG. 3 |
| 5,942,069 A | 8/1999 | Gerresheim et al. | 156/128.1 |
| 6,294,119 B1 * | 9/2001 | Nakamura | 152/DIG. 2 |
| 6,523,585 B1 * | 2/2003 | Ducci et al. | 152/DIG. 2 |
| 2001/0035255 A1 * | 11/2001 | Sergel et al. | 156/130 |
| 2002/0007893 A1 * | 1/2002 | Koyama et al. | 156/123 |

FOREIGN PATENT DOCUMENTS

| | | |
|---|---|---|
| EP | 747243 | 12/1996 |
| EP | 812710 | 12/1997 |
| EP | 847880 | 6/1998 |
| EP | 895878 | 2/1999 |
| JP | 11-48711 * | 2/1999 |
| JP | 11-139107 * | 5/1999 |
| JP | 2000-016010 * | 1/2000 |
| WO | WO 99/48707 * | 9/1999 |

* cited by examiner (COMPARATIVE)

TIRE WITH ELECTRICALLY NON-CONDUCTIVE TREAD WHICH CONTAINS A SELF LOCKING ELECTRICALLY CONDUCTIVE RUBBER STRIP EXTENDING THROUGH SAID TREAD TO ITS RUNNING SURFACE

This application claims the benefit of co-pending Provisional Application Ser. No. 60/523,053, filed Nov. 18, 2003, and fully incorporated herein by reference.

FIELD OF THE INVENTION

This invention relates to a tire having an electrically non-conductive tread which contains an electrically conductive rubber strip which extends through at least a portion of the tread to its running surface in a wave configured shape, and therefore not a continuous straight line within said tread, in which at least a portion of the rubber strip is in a shape of, for example, a substantially sinusoidal, cycloid al and/or zigzag form, to thereby provide a mechanical self-locking configuration between tread segments through which the rubber strip extends and divides. In particular, said tread is composed of a cap/base configuration. The outer cap layer is of a relatively electrically non-conductive rubber composition having a running surface intended to be ground-contacting. The tread base layer, underlying the tread cap layer, is of a relatively electrically conductive rubber composition and is not normally intended to be ground-contacting. A thin rubber strip, unitary with and as an extension of said tread base layer, which is thereby relatively electrically conductive, extends radially outward from said tread base layer of which at least a portion of the rubber strip is in a form of a wave-shaped configuration through, and therefore within, said tread cap layer to an outer running surface of said tread cap layer. In practice therefore, said rubber strip extends from, and as a part of, said tread base layer through said tread cap layer. In practice, said thin layer extending in said tread cap exhibits substantially at least one half an undulation, and preferably substantially at least two undulations of its wave configured shape of, for example, a substantially sinusoidal, cycloid al and/or zigzag form. The form of the individual undulations of the wave shaped configuration of the strip within the tread may be the same or different.

BACKGROUND FOR THE INVENTION

This invention relates to tires having treads which contain only a minimal amount, if any, of carbon black reinforcement, which are substantially silica reinforced and which thereby have a relatively low electrical conductivity. Accordingly a path of electrical conductivity is desired through such tread to a ground-contacting portion of the tread in order to dissipate static electricity from the tire to the ground.

Tire treads are often provided as a rubber cap/base construction in which the tread cap layer has an outer running surface designed to be ground contacting and the usually softer supportive tread base layer underlies the tread cap layer and is not intended to be ground contacting. The rubber of the tread base is usually reinforced with a significant amount of carbon black and with a minimal amount, if any, of silica reinforcement and is thereby considerably more electrically conductive than a silica reinforced rubber tread cap layer which contains only a minimal amount, if any, of carbon black reinforcement.

It has heretofore been proposed to provide path of reduced electrical conductivity through a tire tread cap layer of a relatively non electrical conductive rubber composition by providing a thin, relatively electrically conductive, continuously straight shaped rubber strip extending as a part of an electrically conductive tread base through the tread cap layer to its running surface. For example, see U.S. Pat. No. 5,942,069 and European Patent Publication Nos. EP0681931, EP0747243, EP0812710 and EP0847880.

However, such heretofore described electrically conductive rubber strips are seen herein to simply extend directly through the relatively electrically nonconductive tread cap in a basically a straight configuration.

In practice, where the electrically conductive strip extending through the tread is of a rubber composition having a significantly lower modulus than the rubber composition of the tread cap, lateral stability of the tire tread may be somewhat weakened. In particular, where the softer rubber strip divides the tread blocks, or segments, through which the rubber extends and divides into at least two sub-parts with the softer rubber strip therebetween, lateral stability of the tire tread and thereby the handling of the tire might thereby be somewhat compromised.

According to this invention, a relatively electrically conductive rubber strip is extended from an electrically conductive tread base layer rubber composition through an electrically resistive tread cap rubber composition where at least a portion of said rubber strip is of a wave configured shape of, for example, a substantially sinusoidal, cycloid al or zigzag form or combination thereof instead of being of a continuous straight line shape. By the term "sinusoidal" it meant that the shape, while approximating a substantial sinusoidal form may somewhat approximate other repetitive patterns so long as the rubber strip is of a wave configured shape composed of at least half of an undulation and preferably at least one and more preferably at least two undulations.

Accordingly, it is one aspect of this invention to provide a tire tread of a cap/base construction having an electrically conductive path extending through the electrically nonconductive tread cap where the electrically conductive path is provided by an electrically conductive rubber strip which exhibits a wave configured shape which may be, for example, of a substantially sinusoidal, cycloid al or zigzag form, or combination thereof, to thereby create a self-locking mechanical configuration between tread segments, particularly tread cap segments, or tread blocks, which are separated by the electrically conductive strip to aid in preserving the lateral stability of the tread cap layer.

In the description of this invention, the terms "rubber" and "elastomer" if used herein, are used interchangeably, unless otherwise indicated. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art. The terms "cure" and "vulcanize" may be used interchangeably unless otherwise indicated.

In the description of this invention, the term "phr" refers to parts of a respective material per 100 parts by weight of rubber, or elastomer.

SUMMARY AND PRACTICE OF THE INVENTION

In accordance with this invention, a tire is provided having a tread of a cap/base construction comprised of:

(A) a relatively electrically non-conductive rubber tread cap layer having an outer running surface (the running surface is intended to be ground-contacting), (B) a relatively electrically conductive (relative to said tread cap layer) rubber tread base layer underlying said tread cap layer (and therefore not intended to be ground-contacting), and (C) a thin, relatively electrically conductive (relative to said tread cap layer), rubber strip extending radially outward from said tread base layer through said tread cap layer to and including said outer running surface of said tread cap layer, wherein at least a portion of said thin rubber strip is of a wave shaped configuration (non-straight line) to thereby create a mechanical self-locking configuration between tread cap layer segments through which said electrically conductive rubber strip extends and divides.

In practice, said wave shaped rubber strip is preferably unitary with (e.g. co-extruded with), integral with (e.g. co-vulcanized with) and of the same composition of said rubber tread base layer. However, alternatively, said wave shaped rubber strip may integral with (e.g. co-vulcanized with) but not of the same rubber composition of said rubber tread base layer.

In one aspect of the invention, at least a portion of said thin rubber strip is of a wave configuration substantially in shape of, for example, a sinusoidal, cycloid or zigzag shape, or combination thereof. In practice, said portion of said rubber strip exhibits substantially at least one half of an undulation, preferably at least one undulation and more preferably at least two undulations of its wave configured shape. In further practice, the shape of individual undulations of the rubber strip may be substantially the same of different. For example, the amplitudes and/or the wave lengths of the individual undulations may be the substantially the same or different, and, therefore the wave configured shape may only somewhat approximate a sinusoidal, cycloid al or zigzag shape.

For the wave shaped rubber strip of this invention, the term "undulation" simply refers to one complete repetitive pattern.

Further, at least one portion, or portions, of the rubber strip may be of a straight line form positioned, for example, within the tread cap rubber layer to intersect or otherwise join its outer running surface, to intersect or otherwise join its underlying tread base rubber layer or positioned within the wave shaped rubber strip spaced apart from the tread rubber cap layer's running surface or spaced apart from its underlying tread base rubber layer.

In practice, the wave shaped strip which extends in its wave configuration through the tread cap rubber layer is preferably unitary with said tread base rubber layer and therefore an extension of and of the same rubber composition of said tread base rubber layer.

By the term "sinusoidal" or "substantially sinusoidal" configured, or shaped portion of the electrically conductive wave shaped rubber strip, it is meant that the rubber strip extends within the tread cap rubber layer, preferably in a substantially radial direction, of which at least a portion of the rubber strip is in a substantially sinusoidal shape which may constitute more or less than one complete undulation, and at least a half of an undulation, and in which the amplitude and/or the length of consecutive undulations, or portions thereof, may vary and thereby present a modulated format. In practice, it is understood that the curve of said wave shaped strip may only somewhat approximate a sine curve configuration. The rubber strip thereby creates a mechanical self-locking configuration within the tread cap rubber layer and between the tread segments through which the rubber strip extends and divides. It is to be appreciated that, therefore, the rubber strip is not in a shape of a singular straight line extending through the tread cap layer.

By the term "cycloid al" or "substantially cycloid al" configured, or shaped portion of the electrically conductive wave shaped rubber strip, it is meant that the rubber strip extends within the tread cap rubber layer, preferably in a substantially radial direction, of which at least a portion of the rubber strip is in a substantially cycloid al shape, where repetitive patterns present a similar concavity, and in which the amplitude and/or length of consecutive undulations, or portions thereof, may vary and thereby present a modulated format. In practice, it is understood that the curve of said wave shaped strip may only approximate a cycloid al curve configuration. The rubber strip thereby creates a mechanical self-locking configuration within the tread cap layer and between the tread segments through which the rubber strip extends and divides. It is to be appreciated the, therefore, the rubber strip is not in a shape of a singular straight line through the tread cap layer.

By the term "zigzag" or "substantially zigzag" configured, or shaped portion of the electrically conductive wave shaped rubber strip, it is meant that the rubber strip extends within the tread cap rubber layer, preferably in a substantially radial direction, of which at least a portion of the rubber strip is in a substantially zigzag shape in a form of a series of segments composed of connecting relatively straight lines, which may constitute more or less than one complete undulation, and at least a half of an undulation, and in which the amplitude and/or the length of consecutive undulations, or portions thereof, may vary and thereby present a modulated format. In practice, it is understood that the shape of said wave shaped strip may only somewhat approximate a zigzag configuration, of which various of its segments may be of the same of different lengths. The rubber strip thereby creates a mechanical self-locking configuration within the tread cap rubber layer and between the tread segments through which the rubber strip extends and divides. It is to be appreciated that, therefore, the rubber strip is not in a shape of a singular straight line through the tread cap layer.

As hereinbefore discussed, the term "undulation" means one cycle of a substantially repetitive pattern, of, for example, said substantially sinusoidal shape, said substantially cycloid al shape or substantially zigzag shape, or a combination thereof, in a usual sense with allowances for variations in amplitude, wave length and shape in general.

In practice, said tread cap layer rubber composition preferably contains less than 30, alternately less than 25, phr of carbon black reinforcement and said tread base rubber composition and said thin strip rubber composition contains at least 40, alternately at least 45, phr of carbon black reinforcement and preferably at least 10 phr more carbon black reinforcement than said tire cap layer rubber composition.

In practice, said tread cap rubber composition preferably contains amorphous silica based reinforcement, preferably as synthetic precipitated silica and carbon black which contains domains of silica on its surface, and preferably said precipitated silica.

In one aspect of the invention, said tread cap, tread base and substantially sinusoidal or zigzag shaped thin rubber strip may be co-extruded together to form an integral tire tread construction so that, therefore, an integral tire tread construction is comprised of a co-extruded tread cap, tread base and said thin rubber strip extending from, and a part of, said tread base through said tread cap to the running surface of said tread cap in said self locking configuration of said thin strip between tread cap segments through which it extends.

In one aspect of the invention, one end of said thin rubber strip preferably terminates at, and thereby includes a portion of, said running surface of said tread cap.

In practice, it is desired that the thickness of said thin rubber strip is in a range of about 0.5 to about 3 millimeters (mm).

A significant aspect of the invention is the creation of an electrically conductive path through an electrically relatively non-conductive tread cap layer via said wave shaped electrically conductive rubber strip extending from an electrically conductive rubber composition (e.g. the tread base layer) which underlies said tread cap layer to a running surface of the tread cap layer.

This is considered herein as being significant because the wave shape configured portion of the rubber strip as it extends through and thereby divides respective segments of the said tread cap layer is considered herein as substantially preserving the lateral stability of the tread cap layer by the aforesaid formation of the self locking configuration of its wave shape. Such feature is considered herein to be particularly significant where the strength, or modulus (e.g. 300 percent ring modulus) of the rubber composition of the tread cap rubber layer is significantly greater than the modulus of the said thin, wave configured, rubber strip which extends through, and therefore divides, said tread cap layer.

Moreover, it is also considered as being significant because, for one aspect of the invention, it is considered herein that a novel tire tread construction is provided composed of at least two tread sub-parts, or segments, of a relatively electrically non-conductive tread cap layer and said wave shaped rubber strip of a relatively soft rubber composition (e.g. a lower 300 percent ring modulus), which divides said tread cap layer sub-parts, or segments by extending within and through said tread cap layer from, and preferably as a part of, an underlying tread base layer to the outer running surface of the tread cap layer.

In practice, the electrical conductivity of the tread cap rubber segments and underlying integral and co-extruded tread base layer rubber is largely dependent upon the carbon black content and the carbon black type of the respective rubber compositions. A rubber composition which contains only 10 phr of rubber reinforcing carbon black is conventionally significantly more electrically resistive (significantly less electrically conductive) than a rubber composition which contains at least 35 phr of rubber reinforcing carbon black. Such phenomenon is understood to be well known to those having skill in such art. Representative examples of rubber reinforcing carbon blacks are found, for example, in The Vanderbilt Rubber Handbook (1978), Pages 408 through 428, and particularly Page 417.

BRIEF DESCRIPTION OF THE DRAWINGS

The drawings are presented to provide a further understanding of the invention. In particular.

THE DRAWINGS

Figure 1:
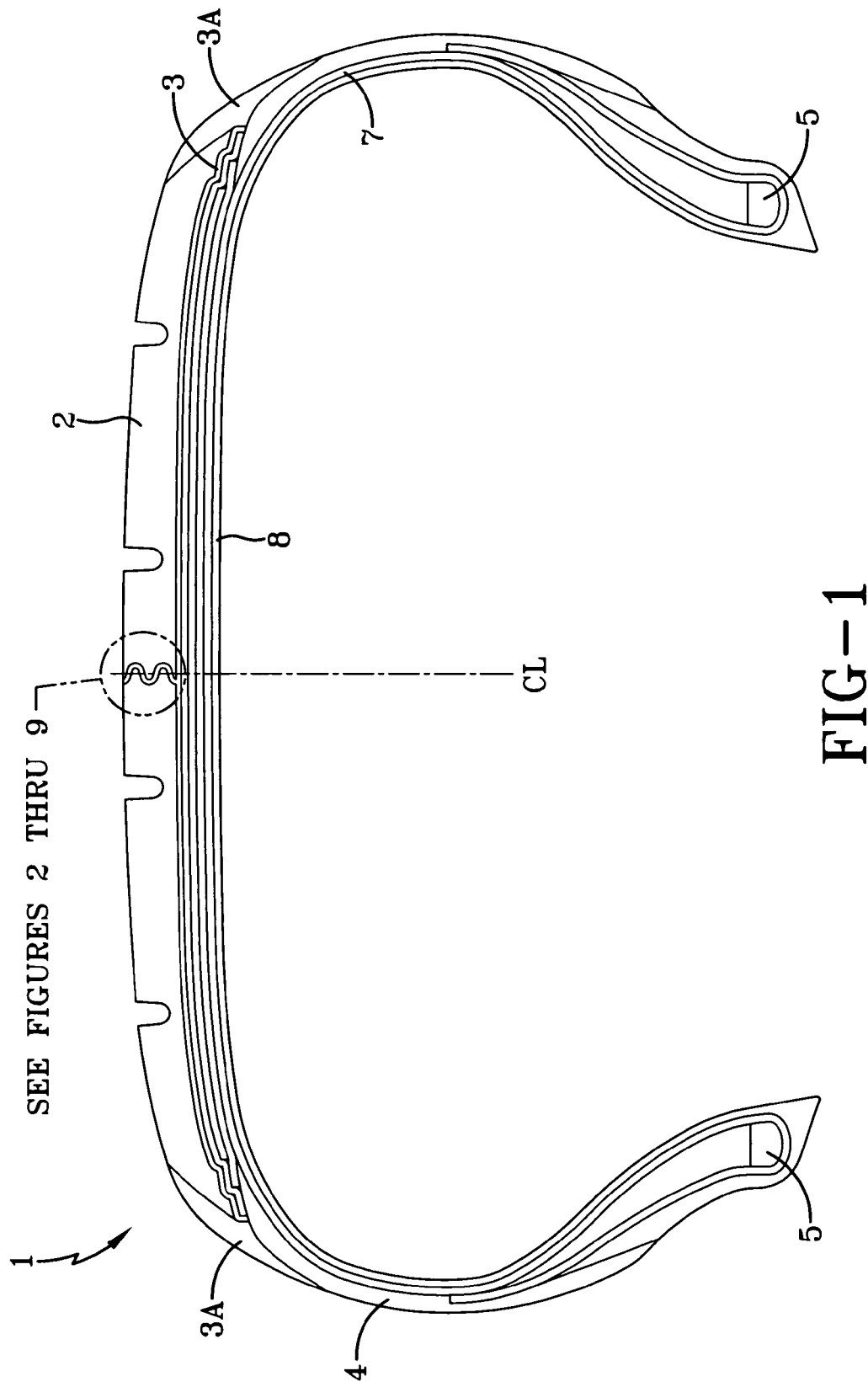
FIG. 1 depicts a partial tire cross-section with a tread of a cap/base construction.

FIG. 1 depicts a cross-section of a tire (1) having a tread of a cap/base construction composed of a tread cap layer (2) which is of a rubber composition which is relatively electrically non conductive which contains less than 10 phr of carbon black and a tread base layer (3), as well as tread miniwings (3A) which are of a rubber composition which contains about 50 phr of carbon black and is therefore considered herein as being relatively electrically conductive. Also depicted in tire cross-section of FIG. 1 is two spaced apart beads (5) and sidewalls (4) substantially extending between said beads (5) and tread. Underlying carcass plies (7) extended from bead (5) to bead (5) through the crown of the tire. An innerliner (8) is positioned as an innersurface of the tire to enhance its air impermeability. A small section, or block positioned, for convenience of this drawing, on the centerline (CL) of the tire tread is identified to be expanded in subsequent FIGS. 2 through 9.

Figure 2:
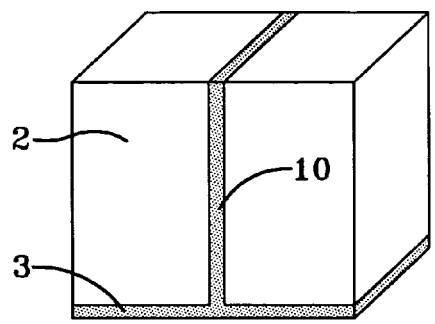
FIGS. 2 through 9 depict representative "blocks" of the tire tread of FIG. 1 with FIG. 2 being a comparative example of a tread block and FIGS. 3 through 9 representing variations of tread blocks of the invention. The tread blocks of FIGS. 2 through 9 are comprised of a tread cap layer and tread base layer with a thin rubber strip extending from the tread base through the tread tire cap to thereby divide the tread cap layer into two sub parts, or segments.

FIG. 2 depicts a comparative tread block taken from the tread of FIG. 1, which includes a portion of the tread base layer (3) and the tread cap layer (2), through which a thin rubber strip (10), which contains about 50 phr of carbon black and is therefore considered herein as being relatively electrically conductive, extends radially outwardly from the tread base layer (3) through the tread cap layer (2) to the running surface of the tire and thereby provides an electrically conductive path, as a part of the tread base through the tread cap layer to its running surface in a straight line and is therefore not considered herein to be in a mechanical self-locking configuration insofar as the two tread cap layer sub parts, or segments, through which the thin layer extends and divides is concerned.

Figure 3:
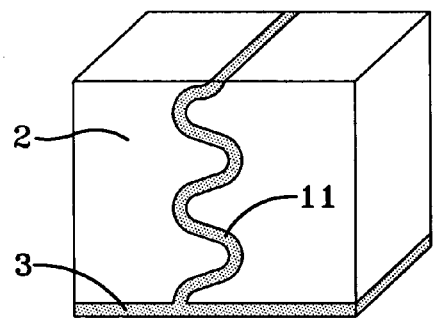

FIG. 3 depicts a tread block taken from the tread of FIG. 1, which includes a portion of the tread base layer (3) and the tread cap layer (2), through which a thin rubber strip (11), which contains about 50 phr of carbon black and is therefore considered herein as being relatively electrically conductive, extends radially outwardly from the tread base layer (3) through the tread cap layer (2) to the running surface of the tire and thereby provides an electrically conductive path, as a part of the tread base through the tread cap layer to its running surface in a sinusoidal wave shape and is therefore considered herein to be in a mechanical self-locking configuration insofar as the two tread cap layer sub parts, or segments, through which the thin layer extends and divides is concerned.

Figure 4:
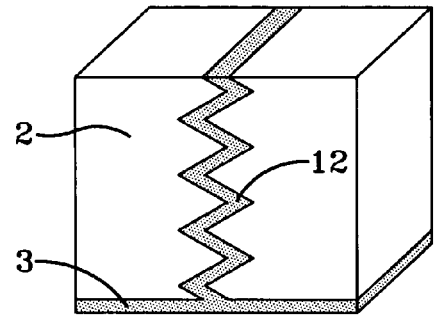

FIG. 4 depicts a tread block taken from the tread of FIG. 1 in a manner similar to FIG. 3 wherein a thin rubber strip (12) is similar to the rubber strip (11) except that it extends through the tread cap layer (2) in a zigzag wave shape and is therefore considered herein to be in a mechanical self-locking configuration insofar as the two tread cap layer sub parts, or segments, through which the thin layer extends and divides is concerned.

Figure 5:
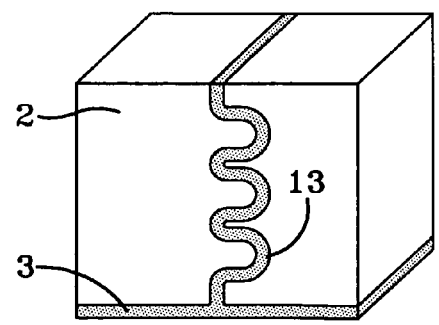

FIG. 5 depicts a tread block taken from the tread of FIG. 1 in a manner similar to FIG. 3 wherein a thin rubber strip (13) is similar to the rubber strip (11) except that it extends through the tread cap layer (2) in a cycloid al wave shape and is therefore considered herein to be in a mechanical self-locking configuration insofar as the two tread cap layer sub parts, or segments, through which the thin layer extends and divides is concerned.

Figure 6:
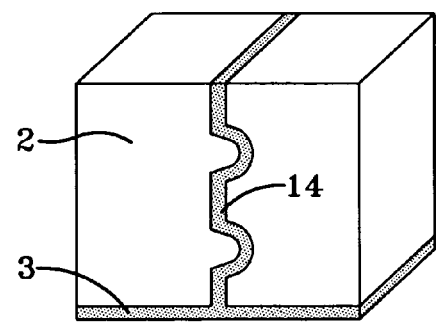

FIG. 6 depicts a tread block taken from the tread of FIG. 1 in a manner similar to FIG. 5 wherein a thin rubber strip (14) is similar to the rubber strip (13) except that the cycloidal portions of the wave configured strip are separated by a straight line portion and additional straight line portions provide connections of the strip with the base layer (3) and the running surface of the tread cap layer (2) and is therefore considered herein to be in a mechanical self-locking configuration insofar as the two tread cap layer sub parts, or segments, through which the thin layer extends and divides is concerned.

Figure 7:
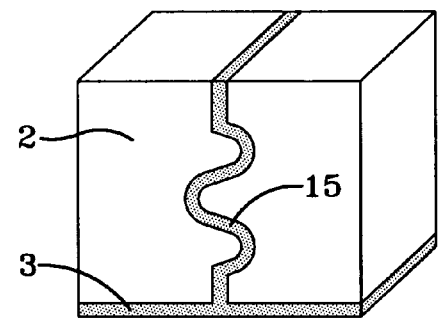

FIG. 7 depicts a tread block taken from the tread of FIG. 1 in a manner similar to FIG. 3 wherein a thin rubber strip (15) is similar to the rubber strip (11) wherein the strip contains straight line portions which provide connections of the strip with the base layer (3) and the running surface of the tread cap layer (2) and is therefore considered herein to be in a mechanical self-locking configuration insofar as the two tread cap layer sub parts, or segments, through which the thin layer extends and divides is concerned.

Figure 8:
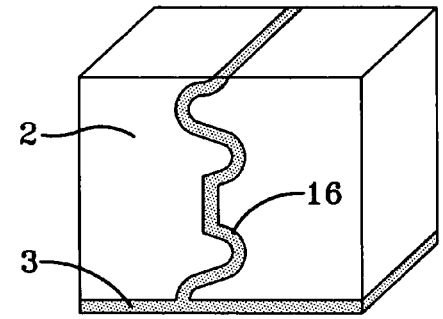

FIG. 8 depicts a tread block taken from the tread of FIG. 1 in a manner similar to FIG. 3 wherein a thin rubber strip (16) is similar to the rubber strip (11) except that a portion of the strip contains a straight line portion which divides the wave configured portions of the strip and is therefore considered herein to be in a mechanical self-locking configuration insofar as the two tread cap layer sub parts, or segments, through which the thin layer extends and divides is concerned.

Figure 9:
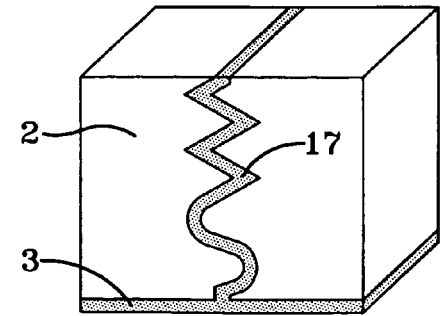

FIG. 9 depicts a tread block taken from the tread of FIG. 1 in a manner similar to FIGS. 3 and 4 wherein a thin rubber strip (17) is similar to a combination of the sinusoidal shaped rubber strip (11) connected to the zigzag shaped strip (12) and is therefore considered herein to be in a mechanical self-locking configuration insofar as the two tread cap layer sub parts, or segments, through which the thin layer extends and divides is concerned.

For the purposes of FIGS. 2 through 9, the thin rubber strip is presented as being a part of and of the same rubber composition of the tread base layer.

For the purposes of FIGS. 2 through 9 the tread cap layer is envisioned as being of a rubber composition having a significantly greater 300 percent ring modulus physical property (e.g. a tougher rubber) than the rubber composition of the tread base layer and therefore significantly tougher than the relatively electrically conductive thin strip extending through the tread cap layer. Thus, the thin strip is depicted as not being as tough as the tread cap layer through which it extends so that the lateral dimensional stability of the tread cap would be expected to be negatively influenced, or impacted, by the presence of the strip. Accordingly, it is considered herein that the mechanical self-locking effect of the wave configuration of the penetrating relatively electrically conductive strip of FIGS. 3 through 9 provide a physical lateral, or axial, dimensional stability to the tread cap layer segments through which the strip extends and divides. Indeed, it is considered herein that the thin rubber strip adds dimensional stability and thereby serves to substantially preserve the lateral stability to the tread cap layer through its wave form mechanically self-locking effect.

In the practice of this invention, said tread cap rubber composition when it contains a substantial precipitated silica reinforcement content, may preferably contain a coupling agent as having a moiety reactive with hydroxyl groups (e.g. silanol groups) contained on the surface of the silica and another moiety interactive with the diene-based elastomer(s).

Such coupling agent may be, for example, a bis(3-triethoxysilylalkyl) polysulfide ((for example a bis(3-triethoxysilylpropyl) polysulfide)) having an average of from 2 to 4 connecting sulfur atoms in its polysulfidic bridge or an intermediate average of from 2 to about 2.6 or an average of from 3.5 to about 4 connecting sulfur atoms in its polysulfidic bridge. An average of from 2 to about 2.6 connecting sulfur atoms may be preferred.

Such coupling agent may be an organomercaptoalkoxysilane or a capped organomercaptoalkoxysilane.

Representative examples of various organomercaptoalkoxysilanes are, for example, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, and tripropoxy mercaptopropyl silane.

The coupling agent may, for example, be added directly to the elastomer mixture or may be added as a composite of precipitated silica and such coupling agent formed by treating a precipitated silica therewith.

In practice, the rubber composition may contain a silica modified carbon black which contains domains of exposed silica on the surface of the carbon black. Such carbon black may be prepared, for example, by reaction of an alkyl silane (e.g. an alkoxy silane) with carbon black or by co-fuming carbon black and silica at an elevated temperature. For example, see U.S. Pat. Nos. 5,679,728 and 6,028,137.

In practice, the synthetic amorphous silica for the rubber composition may be selected from aggregates of precipitated silica, which is intended to include precipitated aluminosilicates as a co-precipitated silica and aluminum, and from fumed (pyrogenically formed) silica.

Such precipitated silica is, in general, well known to those having skill in such art. For example, such precipitated silica may be precipitated by controlled addition of an acid such as, for example, hydrochloric acid or sulfuric acid, to a basic solution (e.g. sodium hydroxide) of a silicate, for example, sodium silicate, usually in the presence of an electrolyte, for example, sodium sulfate. Primary, colloidal silica particles typically form during such process which quickly coalesce to form aggregates of such primary particles and which are then recovered as precipitates by filtering, washing the resulting filter cake with water or an aqueous solution, and drying the recovered precipitated silica. Such method of preparing precipitated silica, and variations thereof, are well known to those having skill in such art.

The precipitated silica aggregates preferably employed in this invention are precipitated silicas such as, for example, those obtained by the acidification of a soluble silicate, e.g., sodium silicate and may include co-precipitated silica and a minor amount of aluminum.

Such silicas might have, for example, a BET surface area, as measured using nitrogen gas, preferably in the range of about 40 to about 600, and alternately in a range of about 50 to about 300 square meters per gram. The BET method of measuring surface area is described in the *Journal of the American Chemical Society*, Volume 60, Page 304 (1930).

The silica may, for example, have a dibutylphthalate (DBP) absorption value in a range of about 50 to about 400 cm$^3$/100 g, and alternately about 100 to about 300 cm$^3$/100 g.

In practice, the invention the rubber compositions may be prepared in a sequential series of at least two separate and individual preparatory internal rubber mixing steps, or stages, in which the diene-based elastomer is first mixed with the prescribed carbon black and/or silica in a subsequent, separate mixing step and followed by a final mixing step where curatives are blended at a lower temperature and for a substantially shorter period of time.

It is conventionally required after each mixing step that the rubber mixture is actually removed from the rubber mixer and cooled to a temperature below 40° C. and then added back to an internal rubber mixer for the next sequential mixing step, or stage.

The forming of a tire component is contemplated to be by conventional means such as, for example, by extrusion of rubber composition to provide a shaped, unvulcanized rubber component such as, for example, a tire tread. Such forming of a tire tread is well known to those having skill in such art.

It is understood that the tire, as a manufactured article, is prepared by shaping and sulfur curing the assembly of its components at an elevated temperature (e.g. 140° C. to 180° C.) and elevated pressure in a suitable mold. Such practice is well known to those having skill in such art.

The diene-based elastomers for the tire tread rubber composition of this invention, are, for example, homopolymers and copolymers of at least one conjugated diene such as, for example, isoprene and/or 1,3-butadiene and copolymers of at least one conjugated diene, such as for example, isoprene and/or 1,3-butadiene, and a vinyl aromatic compound such as styrene or alphamethyl styrene, preferably styrene.

Representative of such diene-based elastomers are, for example, elastomers comprised of cis 1,4-polyisoprene (natural and synthetic), cis 1,4-polybutadiene, high vinyl polybutadiene having a vinyl 1,2-content in a range of about 35 to about 90 percent, isoprene/butadiene copolymer elastomers, styrene/butadiene copolymer elastomers (organic solvent solution polymerization formed or prepared and aqueous emulsion polymerization formed or prepared), styrene/isoprene copolymer elastomers, and styrene/isoprene/butadiene terpolymer elastomers.

It is readily understood by those having skill in the art that the rubber composition would be compounded by methods generally known in the rubber compounding art, such as mixing the various sulfur-vulcanizable constituent rubbers with various commonly used additive materials such as, for example, curing aids such as sulfur, activators, retarders and accelerators, processing additives, such as rubber processing oils, resins including tackifying resins, plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

The mixing of the rubber composition can preferably be accomplished by the aforesaid sequential mixing process. For example, the ingredients may be mixed in one or more non-productive (preparatory) stages followed by a productive (final) mix stage. The final curatives are typically mixed in the final stage which is conventionally called the "productive" or "final" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art.

While certain representative embodiments and details have been shown for the purpose of illustrating the invention, it will be apparent to those skilled in this art that various changes and modifications may be made therein without departing from the spirit or scope of the invention.

What is claimed is:

1. A tire having a tread of a cap/base construction comprised of:
    (A) an electrically non-conductive rubber tread cap layer having an outer running surface,
    (B) an electrically conductive rubber tread base layer underlying said tread cap layer, and
    (C) a thin, electrically conductive, wave shape configured rubber strip extending radially outward from said tread base layer through said tread cap layer to and including said outer running surface of said tread cap layer to thereby create a mechanical self-locking configuration between tread cap layer segments through which said electrically conductive rubber strip extends and divides,
    characterized in that said thin, wave-shaped, rubber strip is both unitary with and of the same rubber composition as the said tread base layer wherein the wave-shape of said rubber strip is contained within said tread cap layer, wherein said wave-shape of said thin strip is comprised of at least two undulations within said tread cap layer,
    wherein the rubber composition of the tread cap rubber layer is significantly tougher than the rubber composition of said thin strip which extends through and divides said tread cap rubber layer in the sense of the 300 percent ring modulus of the tread cap rubber layer being significantly greater than such modulus of the said rubber strip, said thin rubber strip thereby being softer than said tread cap rubber layer, and
    wherein said wave shape of said softer thin strip extending through said tread cap rubber layer promotes the lateral stability of the tread by said mechanical self-locking configuration within said tread cap rubber layer.

2. The tire of claim 1 wherein at least one portion of said wave shaped rubber strip:
    (A) is of a sinusoidal configuration, cycloidal configuration or combination thereof, or
    (B) is of a zigzag configuration, or
    (C) is of combination of zigzag configuration and at least one of sinusoidal and cycloidal configuration.

3. The tire of claim 1 wherein said wave shaped rubber strip is of a sinusoidal configuration.

4. The tire of claim 1 wherein said wave shaped rubber strip is of a cycloidal configuration.

5. The tire of claim 1 wherein said wave shaped rubber strip is of a combination of sinusoidal and cycloidal configuration.

6. The tire of claim 1 wherein said wave shaped rubber strip is of a combination of zigzag and sinusoidal configuration.

* * * * *